US007511628B2

(12) United States Patent
Salvestrini

(10) Patent No.: US 7,511,628 B2
(45) Date of Patent: Mar. 31, 2009

(54) STATUS INDICATOR CIRCUIT FOR A DIMMER SWITCH

(75) Inventor: Christopher J Salvestrini, Allentown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 352 days.

(21) Appl. No.: 11/429,757

(22) Filed: May 8, 2006

(65) Prior Publication Data

US 2006/0255959 A1 Nov. 16, 2006

Related U.S. Application Data

(60) Provisional application No. 60/681,276, filed on May 16, 2005.

(51) Int. Cl.
*G08B 21/00* (2006.01)

(52) U.S. Cl. ....................... 340/664; 340/644; 340/635; 315/136; 315/291; 362/95

(58) Field of Classification Search ................. 340/664, 340/644, 635, 641; 315/136, 291; 362/95
See application file for complete search history.

(56) References Cited

U.S. PATENT DOCUMENTS 3,864,561 A 2/1975 Spira et al. ................ 240/2 SP
4,408,180 A 10/1983 Metz
4,514,789 A * 4/1985 Jester .......................... 362/95
4,893,062 A * 1/1990 D'Aleo et al. .............. 315/291
5,008,865 A * 4/1991 Shaffer et al. ................. 368/10
5,017,837 A 5/1991 Hanna et al. ................ 315/136
5,146,153 A * 9/1992 Luchaco et al. ........ 340/825.69
5,191,265 A 3/1993 D'Aleo et al.
5,237,264 A 8/1993 Moseley et al.
5,248,919 A 9/1993 Hanna et al.
5,399,940 A 3/1995 Hanna et al. ................ 315/129
5,430,356 A * 7/1995 Ference et al. .............. 315/291
5,754,036 A * 5/1998 Walker ....................... 323/237
6,300,727 B1 * 10/2001 Bryde et al. ................ 315/294
6,734,381 B2 * 5/2004 Mayo et al. ................. 200/329
2006/0109702 A1 5/2006 Weightman et al. ......... 363/149
2006/0272569 A1 * 12/2006 Lehmer et al. .............. 116/200

* cited by examiner

*Primary Examiner*—Eric M Blount
(74) *Attorney, Agent, or Firm*—Ostrolenk, Faber, Gerb & Soffen, LLP

(57) ABSTRACT

A load control device for controlling the amount of power delivered to an electrical load from an AC power source comprises a semiconductor switch having a control input, a triggering circuit, a timing circuit, and a status indicator circuit. Preferably, the status indicator circuit includes a light-emitting diode in a rectifier bridge. In a first embodiment, the status indicator circuit is coupled in series with a capacitor in the timing circuit such that the status indicator is illuminated to a dim level when the load is not powered and the status indicator is illuminated to a bright level when the load is powered. In a second embodiment, the status indicator circuit is coupled in series with a control input of the semiconductor switch such that the status indicator is not illuminated when the load is not powered and the status indicator is illuminated when the load is powered.

33 Claims, 6 Drawing Sheets

10
16
12
18
14

200
110
R12
130
245
DC+
D10
AC1
D14
AC2
C20
D16
D12
BR20
DC-
R20
240
L10
220
S10
R24
HOT
DIMMED HOT
108
102
106
104

STATUS INDICATOR CIRCUIT FOR A DIMMER SWITCH

RELATED APPLICATIONS

This application is related to and claims the benefit and priority of commonly-assigned U.S. Provisional Application Ser. No. 60/681,276, filed May 16, 2005, having the same title as the present application, the entire disclosure of which is herein incorporated by reference.

FIELD OF THE INVENTION

The present invention relates to dimmers for controlling the intensity of a lighting load, specifically dimmers that include a status light that is off or illuminated to a dim level when the lighting load is not powered and is illuminated brightly when the lighting load is powered.

BACKGROUND OF THE INVENTION

A conventional two-wire dimmer has two connections: a "hot" connection to an alternating-current (AC) power supply and a "dimmed hot" connection to the lighting load. Standard dimmers use one or more semiconductor switches, such as triacs or field effect transistors (FETs), to control the current delivered to the lighting load and thus control the intensity of the light. The semiconductor switches are typically coupled between the hot and dimmed hot connections of the dimmer.

Standard wall-mounted dimmers include a user interface having a means for adjusting the intensity of the lighting load, such as a linear slider, a rotary knob, or a rocker switch. Some dimmers also include a button that allows for toggling of the lighting load from off (no power is conducted to the lighting load) to on (power is conducted to the lighting load to illuminate the lighting load). It is desirable to include a status indicator, such as a small lamp or light emitting diode (LED), on the user interface to indicate the status of the lighting load, i.e. on or off.

Many prior art dimmers have incorporated night-lights that are illuminated when the connected lighting load is off and are dimmed or not illuminated when the connected lighting load is on. One example of such a dimmer is disclosed in U.S. Pat. No. 3,864,561, issued Feb. 4, 1975, entitled DIMMER SWITCH WITH ILLUMINATED KNOB. These dimmers include a neon lamp, or an equivalent light source, and a series current-limiting impedance. The neon lamp and the impedance are connected in parallel with the semiconductor switch such that a voltage is developed across the neon lamp when the semiconductor switch is non-conducting. Thus, the neon lamp will have an intensity that is inversely proportional to the intensity of the connected lighting load. However, even though this convention of illuminating the night-light provides an indication of the status of the connected lighting load, the convention is opposite a more common expectation that the status lamp should be on when the connected lighting load is on and off when the load is off.

U.S. Pat. No. 5,017,837, issued on May 21, 1991, entitled INDICATOR LAMP SYSTEM, discloses a load control system that has an indicator lamp that provides a dim light when the load power is off and provides a brighter light when the load power is on. The dim light that is provided when the lighting load is off is bright enough to be seen in a darkened room. However, this system requires many electrical components in addition to the semiconductor switch and related control circuitry for controlling the current through the connected lighting load. This leads to higher costs and limited space on the printed circuit board (PCB) of the dimmer.

Some prior art dimmers are considered "smart" dimmers since they include a microcontroller or other processing means to allow an advanced set of control features and feedback options to the end user. An example of a smart dimmer is disclosed in commonly-assigned U.S. Pat. No. 5,248,919, issued on Sep. 28, 1993, entitled LIGHTING CONTROL DEVICE, which is herein incorporated by reference in its entirety. Smart dimmers typically include a plurality of actuators for receipt of user inputs and a plurality of LEDs for feedback to the user. In order to provide a direct-current (DC) voltage to power the microprocessor and the LEDs, the dimmer includes a power supply. In a two-wire smart dimmer, the power supply can only draw a small current through the lighting load when the semiconductor switch is non-conducting. In order to provide the LED feedback to the user, the smart dimmer is required to include the microprocessor and the power supply, which increase the cost and design requirements of the dimmer.

Thus, there exists a need for a simple status indicator circuit that does not require a power supply or many other components and operates in a manner in which the status indicator is off or at a dim level when the lighting load is off and at a bright level when the load is on.

SUMMARY OF THE INVENTION

According to the present invention, a load control device for controlling the amount of power delivered to an electrical load from an AC power source comprises a controllably conductive device adapted to be coupled between the AC power source and the electrical load to control the amount of power delivered to the electrical load. A timing circuit is adapted to be coupled between the AC power supply and the lighting load and has an output for providing a timing signal. A triggering circuit is operatively coupled between the output of the timing circuit and a control input of the controllably conductive device. The triggering circuit is operable to conduct a control current through the control input in response to the timing signal. The dimmer further comprises a status indicator circuit operable to conduct the control current and provide a status indication in response thereto.

According to a first embodiment of the present invention, the status indicator circuit is coupled in series electrical connection with a capacitor of the timing circuit such that the status indicator is illuminated to a dim level when the electrical load is not powered and the status indicator is illuminated to a bright level when the electrical load is powered.

According to a second embodiment of the present invention, the status indicator circuit is coupled in series electrical connection with the control input of the semiconductor switch such that the status indicator is not illuminated when the electrical load is not powered and the status indicator is illuminated when the electrical load is powered.

According to another embodiment of the present invention, a load control device for controlling the amount of power delivered to an electrical load from an AC power source comprises a bidirectional semiconductor switch, a timing circuit, a rectifier bridge, a triggering circuit, an optocoupler, and an illuminable status indicator. The bidirectional semiconductor switch is adapted to be coupled between the AC power source and the electrical load. The timing circuit is adapted to be coupled between the AC power source and the electrical load and has an output for providing a timing signal. The rectifier bridge having AC terminals coupled to the timing circuit for receipt of the timing signal and DC terminals.

The triggering circuit is coupled in series electrical connection with the DC terminals of the rectifier bridge and is characterized by a break-over voltage. The triggering circuit is operable to conduct a control current when a voltage across the triggering circuit exceeds the break-over voltage of the triggering circuit. The optocoupler has an input coupled in series electrical connection with the triggering circuit and an output coupled to the control input of the semiconductor switch. When the triggering circuit and the input of the optocoupler conduct the control current, the output of the optocoupler is operable to conduct a gate current through a control input of the semiconductor switch, thereby rendering the semiconductor switch conductive. The illuminable status indicator is coupled in series electrical connection with the triggering circuit and the input of the optocoupler. The status indicator is illuminated when the electrical load is powered and not illuminated when the electrical load is not powered. Preferably, the dimmer further comprises a current limit circuit coupled in series electrical connection with the triggering circuit and the input of the optocoupler, the current limit circuit operable to limit the magnitude of the control current.

Alternatively, the illuminable status indicator may be coupled in series electrical connection with the triggering circuit and in parallel electrical connection with the input of the optocoupler. Accordingly, the current limit circuit has a first current limit portion coupled in series electrical connection with the input of the optocoupler for limiting the magnitude of the current through the input, and a second current limit portion coupled in series electrical connection with the illuminable status indicator for limiting the magnitude of the current through the status indicator.

In addition, the present invention further provides a method of providing an illuminable status indicator on a load control device for controlling the amount of power delivered to an electrical load from an AC power source. The method comprises the steps of: (1) coupling a controllably conductive device in series electrical connection between the AC power source and the electrical load for controlling the power delivered to the electrical load; (2) conducting a charging current through a timing capacitor; (3) conducting a control current through a triggering device in response to the step of conducting a charging current; and (4) conducting a gate current through a control input of the controllably conductive device in response to the step of conducting a control current. The illuminable status indicator is operable to illuminate in response to the step of conducting the control current. Preferably, the illuminable status indicator is also operable to illuminate in response to the step of conducting the charging current.

DETAILED DESCRIPTION OF THE INVENTION

Figure 1:
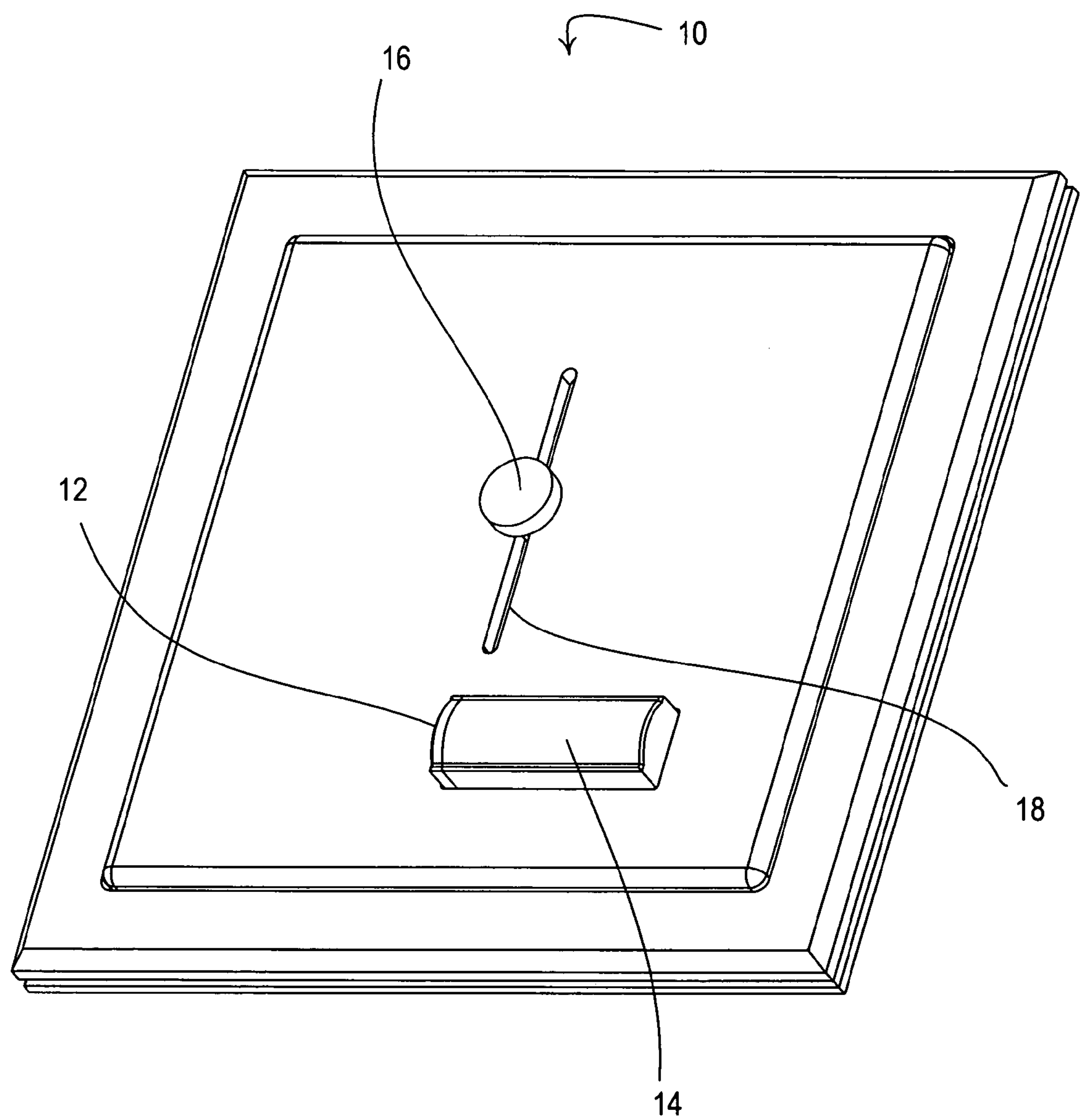
FIG. 1 shows the user interface of a dimmer having a status indicator.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 shows the user interface of a dimmer 10 having a status indicator 12. The status indicator 12 is provided as part of a button 14 of the dimmer 10 and is made of a transparent piece of plastic in order to conduct the light from a light emitting diode (LED) inside the dimmer to the user interface of the dimmer. The button 14 controls a mechanical switch inside the dimmer 10 such that an actuation of the button 14 will toggle the connected lighting load on and off. A knob 16 is provided along a slot 18 to allow for adjustment of the intensity of the connected lighting load. Moving the knob 16 to the top of the slot 18 will increase the intensity of the lighting load and moving the knob 16 to the bottom of the slot 18 will decrease the intensity of the lighting load.

Figure 2:
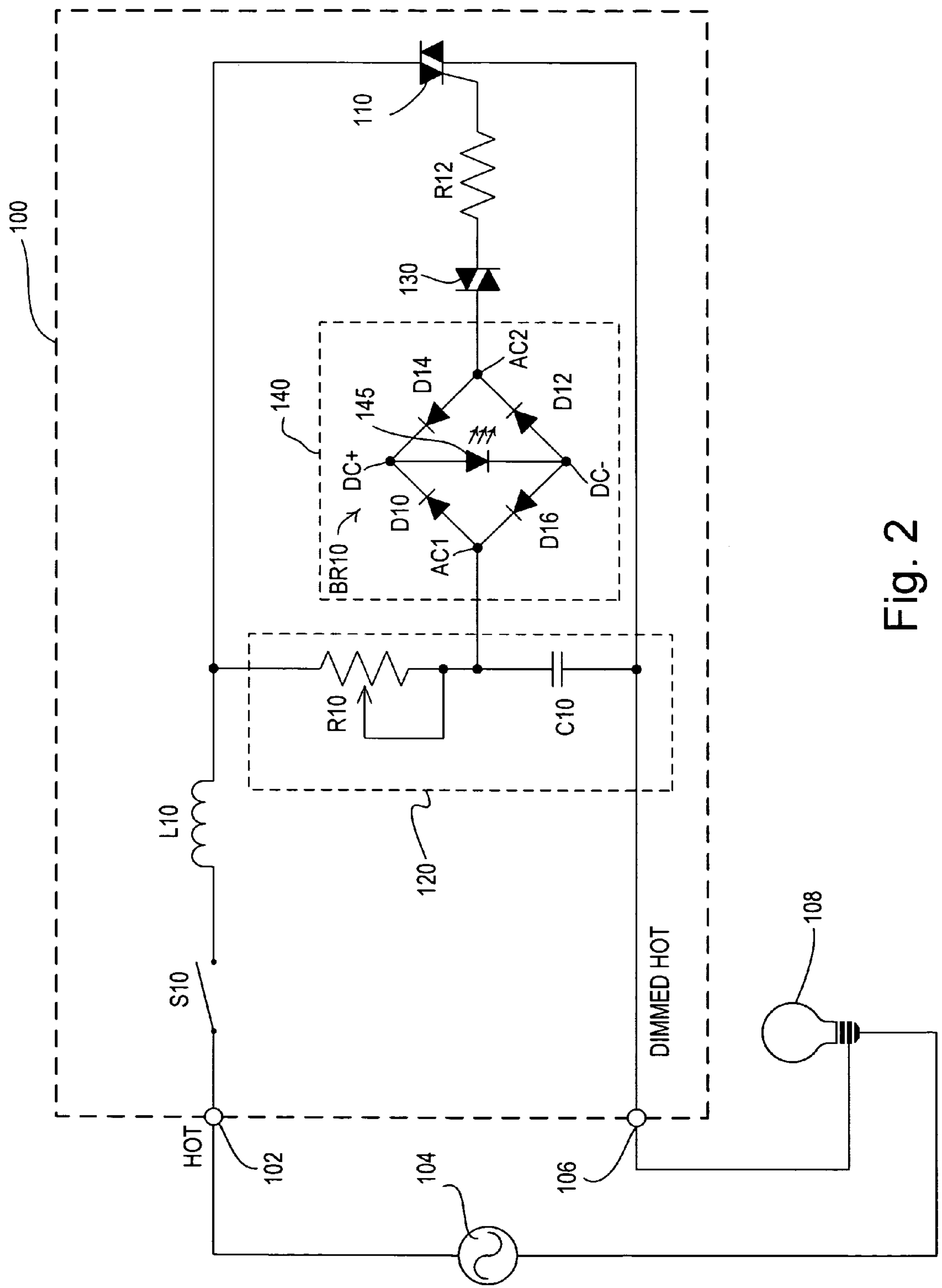
FIG. 2 shows a schematic diagram of a two-wire dimmer including a status LED according to a first embodiment of the present invention.

FIG. 2 shows a two-wire dimmer 100 including a status LED 145 according to a first embodiment of the present invention. The dimmer 100 has two connections: a HOT terminal 102 to an alternating-current (AC) power source 104 and a DIMMED HOT connection 106 to a lighting load 108. A mechanical switch S10 is in series with the HOT terminal and is toggled between an open and a closed state by actuation of the button 14 of the user interface. When the switch S10 is open, the AC power source 104 is completely disconnected from the lighting load 108, and thus the lighting load is not illuminated. The dimmer 100 also employs an inductor L10 for input noise/EMI filtering.

The dimmer 100 employs a semiconductor switch, for example, a triac 110, to control the amount of current delivered to the lighting load 108 and thus control the intensity of the lighting load. The triac 110 is coupled between the HOT terminal 102 and the DIMMED HOT terminal 106 of the dimmer 100 and provides a dimmed-hot voltage at the DIMMED HOT terminal to power the lighting load 108. The dimmed-hot voltage comprises a phase-cut AC voltage waveform, as well known to those of skill in the art, wherein current is only provided to the lamp load after a certain phase angle of each half-cycle of the AC waveform.

A timing circuit 120 comprises a resistor-capacitor (RC) circuit connected between the inductor L10 and the DIMMED HOT terminal 106 having a potentiometer R10 and a capacitor C10. The timing circuit 120 controls a firing voltage, which is the voltage across capacitor C10, for turning on the triac 110 after a selected phase angle in each half-cycle. The charging time of the capacitor C10 is varied in response to a change in the resistance of potentiometer R10 to change the selected phase angle at which the triac 110 begins conducting.

A diac 130 is in series with the control input, or gate, of the triac 110 and is employed as a triggering device. The diac 130 has a break-over voltage (for example 30V), and will pass current to and from the triac gate only when the firing voltage on the capacitor C10 exceeds the break-over voltage of the diac. Current will flow into the gate of the triac 110 during the positive half-cycles and out of the gate of the triac during the negative half-cycles. A current limiting resistor R12 limits the current into and out of the gate of the triac 110 and balances the gate current in both half-cycles.

The dimmer 100 also comprises a status LED circuit 140, which is connected in series with the gate of the triac 110. The status LED circuit 140 includes the status LED 145 inside a rectifier bridge BR10, which comprises diodes D10, D12, D14, and D16. A first pair of AC terminals AC1, AC2, of the bridge BR10 are connected in series electrical connection with the diac 130, the current limiting resistor R12, and the gate of the triac 110. The anode of the LED 145 is connected to the positive output DC terminal DC+ of the bridge BR10 and the cathode of the LED is connected to the negative output DC terminal DC− of the bridge to ensure that current flows in the proper direction through the LED during both half-cycles. During the positive half-cycle, current flows through the diode D10, the LED 145, and the diode D12. For the negative half cycle, current flows through diode D14, the LED 145, and the diode D16.

When the switch S10 is open, the AC power source 104 is disconnected from the lighting load 108 and the rest of the circuitry of the dimmer 100. Thus, the status LED 145 does not illuminate when the lighting load 108 is off. However, when the switch S10 is closed, the lighting load 108 will be powered and the status LED 145 will be illuminated by the gate current of the triac 110.

To provide a desirable aesthetic for the user interface of the dimmer 100, the status LED should be lit at a constant intensity when the lighting load 108 is on. In order for the status LED 145 to be illuminated at a constant intensity, the average current through the LED must be substantially constant. Because the current limiting resistor R12 limits and balances the current through the LED 145 during both half-cycles, the average current through and the intensity of the LED 145 will be substantially constant. Preferably, the magnitude of the average current through the LED 145 in FIG. 1 is approximately 1.5 mA.

Figure 3:
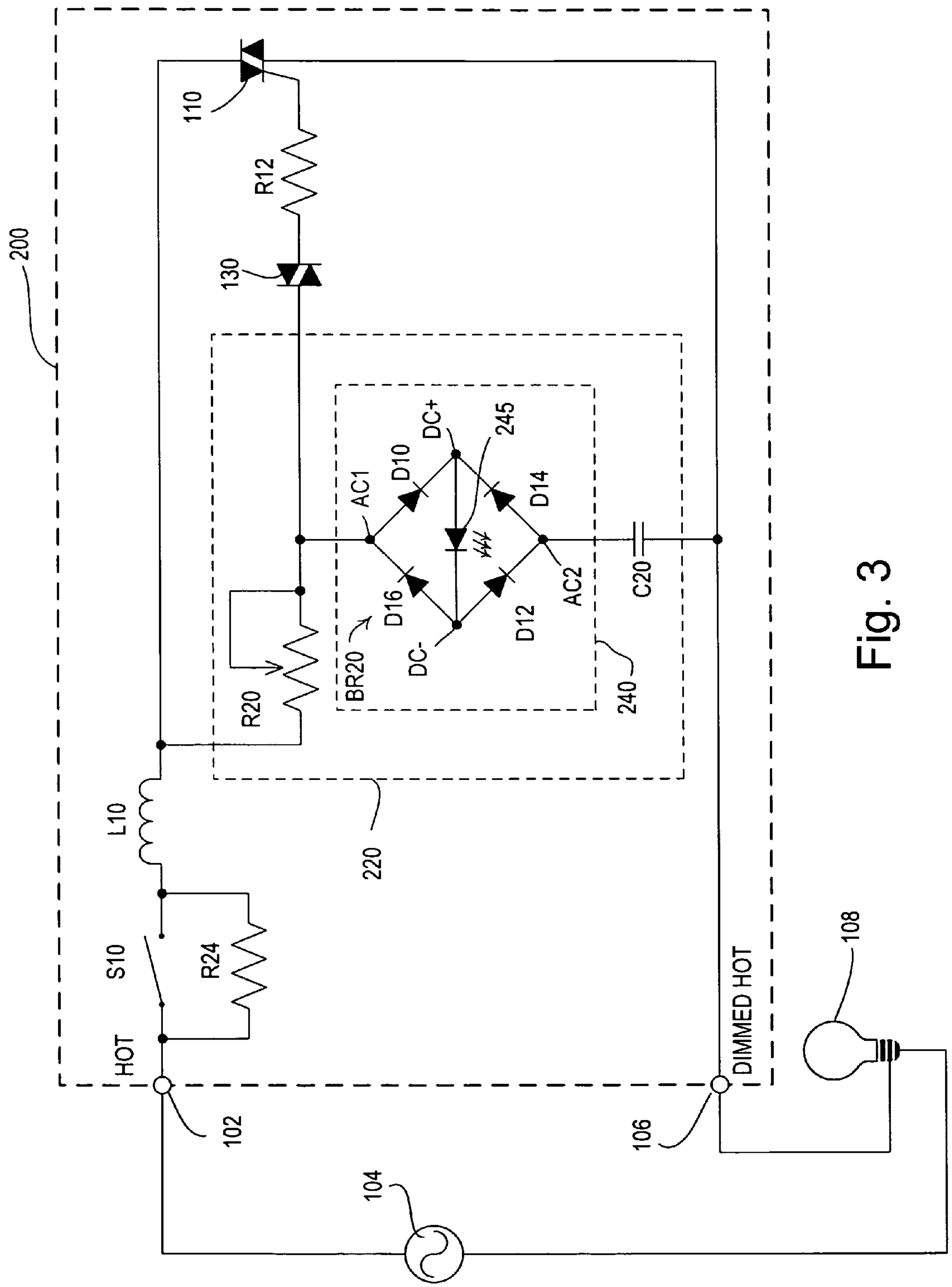
FIG. 3 shows a schematic diagram of a two-wire dimmer including a status LED according to a second embodiment of the present invention.

FIG. 3 shows a two-wire dimmer 200 including a status LED 245 according to a second embodiment of the present invention. In this embodiment, a status LED circuit 240 is in series with the firing capacitor C20 of a timing circuit 220. The status LED 245 is included inside a rectifier bridge BR20 to ensure that current flows through the LED in the proper direction in both half-cycles. When the capacitor C20 is charging during each half-cycle, current flows through a potentiometer R20, the status LED 245, and the capacitor C20. When the voltage at the node AC1 of the bridge BR20 exceeds the break-over voltage of the diac 130, the capacitor C20 discharges through the status LED 245. Thus, the status LED 245 of the second embodiment conducts current when the capacitor C20 is charging and discharging. The status LED 245 conducts four pulses of current during each line cycle of the AC power source 104. The potentiometer R20 preferably has a maximum resistance of 100 k Ω. The capacitance of the capacitor C20 is preferably 0.15 μF.

The average charging current of the capacitor C20 is substantially constant independent of the firing angle of the dimmer 200 (i.e. the charging time of the capacitor). Each half-cycle, the voltage, $V_c$, on the capacitor C20 reaches a maximum value that is approximately the same as the break-over voltage of the diac 130. Thus, the charge, $Q_c$, that accumulates on the capacitor C20 is substantially the same each half-cycle, since $$Q_c = C^* V_c, \quad \text{(Equation 1)}$$

where C is the capacitance of the capacitor C20. Note that the charge accumulated on the capacitor C20 is equal to the integral of the charging current with respect to time, i.e., $$Q_c = \int i_c(t)dt, \quad \text{(Equation 2)}$$

and that the average charging current, $I_{C\text{-}AV}$, is equal to the integral of the charging current with respect to time divided by the period of integration, i.e., $$I_{C\text{-}AV} = (1/T)^* \int i_c(t)dt. \quad \text{(Equation 3)}$$

where T is the period of the line frequency (i.e., 50 Hz or 60 Hz). Thus, it can be determined that the average charging current, $I_{C\text{-}AV}$, of the capacitor C20 is substantially constant since the charge, $Q_c$, that accumulates is substantially constant from one half-cycle to the next.

Since the average charging current and the average gate current are both substantially constant, the total current through, and the intensity of, the status LED 245 are also substantially constant. Preferably, the magnitude of the average charging current is approximately 0.2 mA, thus, the magnitude of the total average current through the status LED 245 of FIG. 3 is approximately 1.7 mA.

Since the status LED circuit 240 is provided in series with the capacitor C20, the status LED 245 can be set to a dim level when the lighting load 108 is off. A resistor R24 is provided in parallel with the switch S10 in the dimmer 200. When the switch S10 is open, the resistor R24 provides a path to charge the capacitor C20 of the timing circuit 220. The resistor preferably has a large enough value (for example, 440 k Ω) such that the capacitor C20 is unable to charge to the break-over voltage of the diac 130 each half-cycle. Thus, the status LED 245 will be illuminated due to the charging current of the capacitor C20 only. Since the charging current is substantially smaller than the gate current of the triac 110, the status LED will illuminate to a dim level when the lighting load 108 is off. The dim level is preferably brilliant enough that someone is able to view the status indicator 12 of the user interface in a darkened room, yet dim enough to be distinguishable over the bright level when the lighting load 108 is on.

Figure 4:
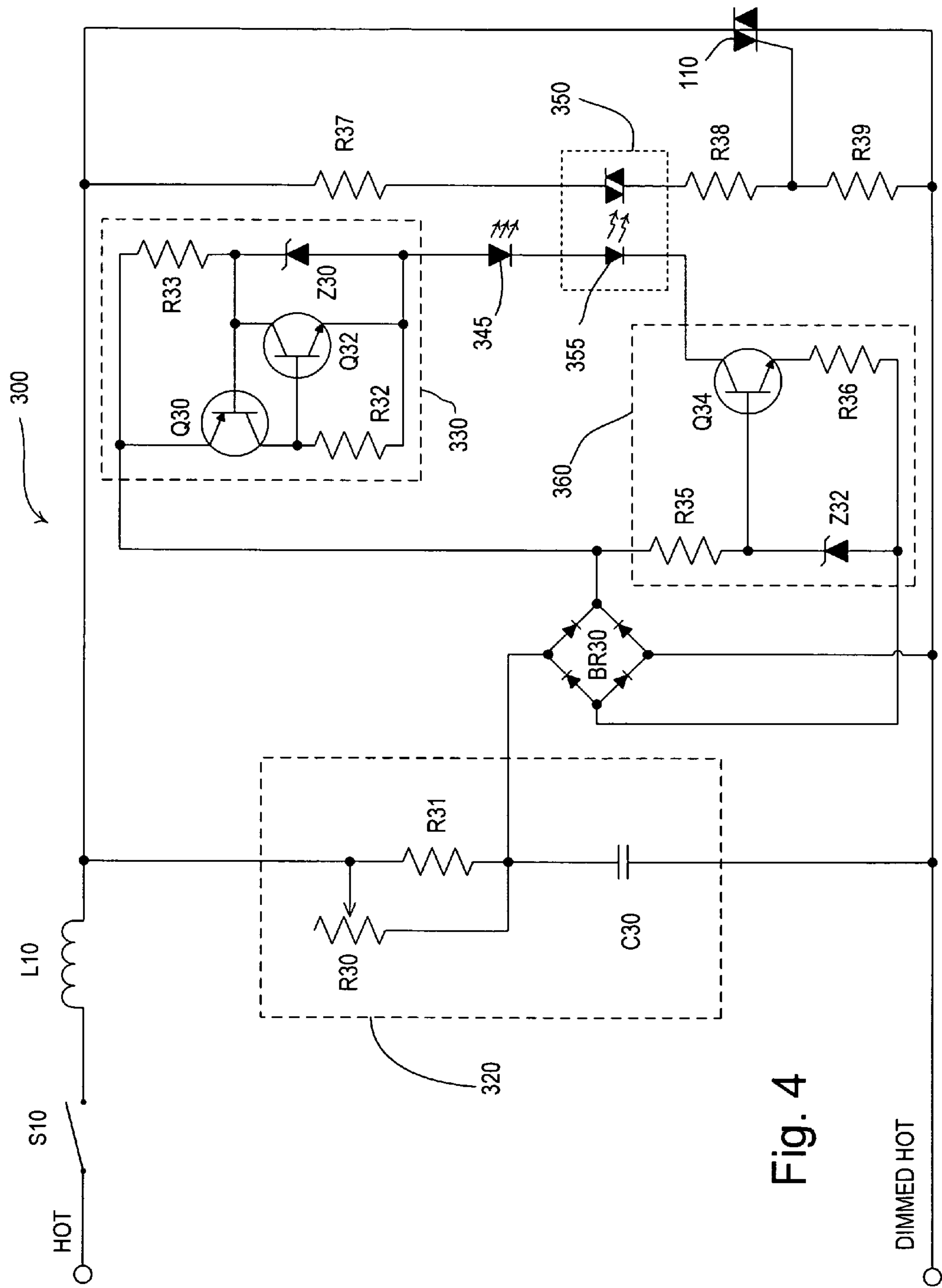
FIG. 4 shows a schematic diagram of a two-wire dimmer including a status LED according to a third embodiment of the present invention.

FIG. 4 shows a two-wire dimmer 300 including a status LED 345 according to a third embodiment of the present invention. The dimmer 300 includes a timing circuit 320 comprising a potentiometer R30, a calibrating resistor R31, and a capacitor C30 and operates in a similar manner to the timing circuit of the previous two embodiments.

The dimmer 300 also includes a triggering circuit 330, which comprises two transistors Q30, Q32, two resistors R32, R33, and a zener diode Z30. The triggering circuit 330 operates in a similar fashion as the diac of the circuits of the previous two embodiments. When the voltage across the triggering circuit 330 exceeds the break-over voltage of the zener diode Z30, the zener diode begins conducting current. The break-over voltage of the zener diode Z30 is preferably 30 V. The transistor Q30 begins conducting as the voltage across the resistor R33 reaches the required base-emitter voltage of the transistor Q30. A voltage is then produced across the resistor R32, which causes the transistor Q32 to begin conducting. This essentially shorts out the zener diode Z30 such that the zener diode stops conducting and the voltage across the triggering circuit 330 falls to approximately zero. A pulse of current through the triggering circuit 330 flows from the capacitor C30 and through a photodiode 355 of an optocoupler 350, which allows current to flow into the gate of the triac 110 in the positive half-cycles and out of the gate in the negative half-cycles.

The dimmer 300 further includes a current-limit circuit 360, comprising a transistor Q34, two resistors R35, R36 and a zener diode Z32. After the triggering circuit 330 begins conducting current, the current will flow through the photodiode 355 of the optocoupler 350, the transistor Q34, and the resistor R36. When the voltage across the resistor R36 plus the base-emitter voltage of the transistor Q34 exceeds the break-over voltage of the zener diode Z32, the transistor Q34 will enter the linear region and limit the current flow out of the emitter of the transistor. The resistance of the resistor R36 is preferably 470 Ω and the break-over voltage of the zener diode Z32 is preferably 3.3V. These values set the current limit of the current-limit circuit 360 to approximately 6 mA.

The status LED 345 is provided in series with the triggering circuit 330, the photodiode 355 of the optocoupler 350, and the current-limit circuit 360. Since the current-limit circuit 360 will limit and balance the current through the status LED 345 from one half-cycle to the next, the average current through and the intensity of the status LED will remain substantially constant. Because the circuitry of the dimmer 300 will not be powered when the switch S1 is open, the status LED 345 will not be illuminated when the lighting load is off.

Figure 5:
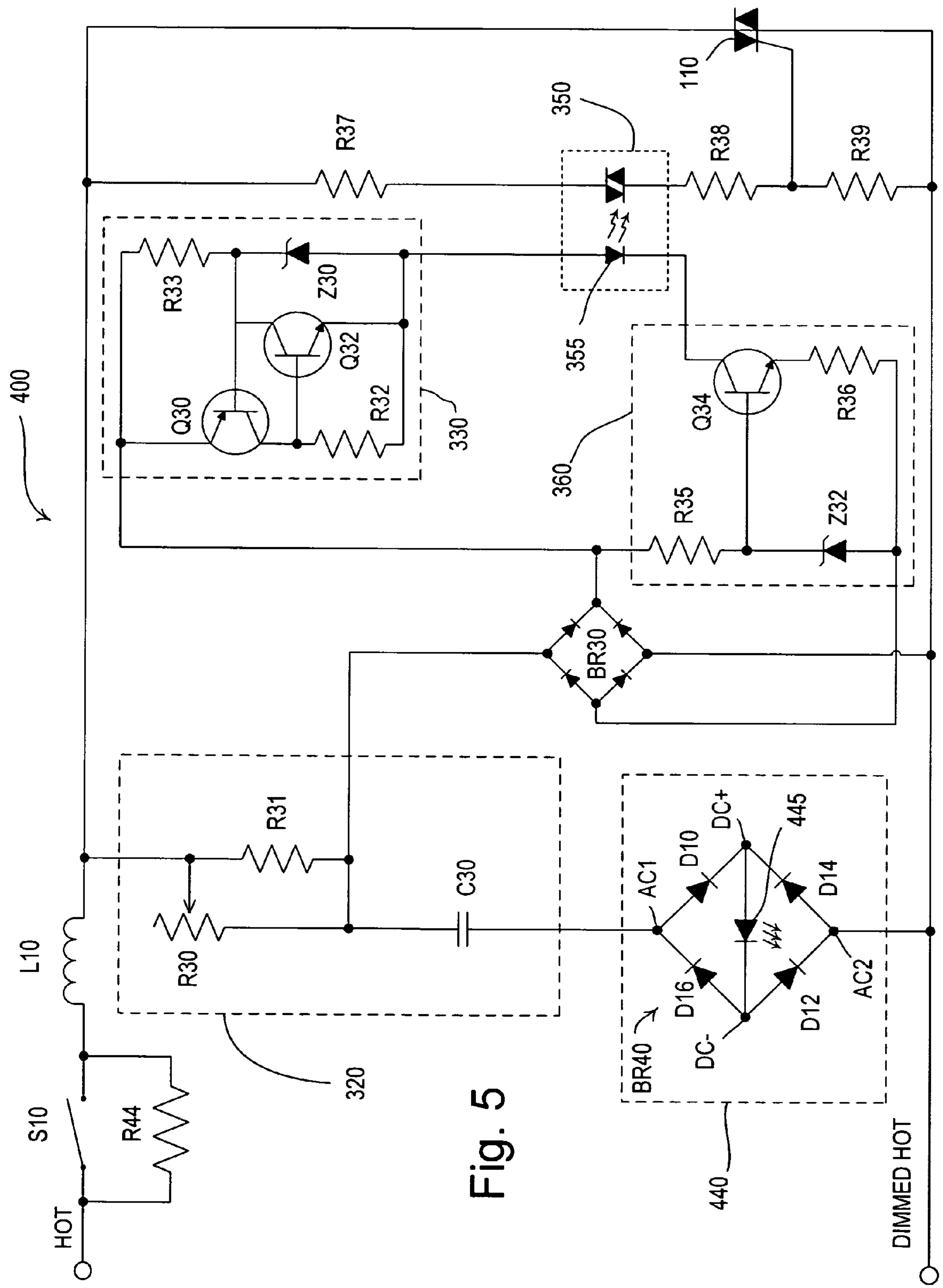
FIG. 5 shows a schematic diagram of a two-wire dimmer including a status LED according to a fourth embodiment of the present invention.

FIG. 5 shows a two-wire dimmer 400 including a status LED 445 according to a fourth embodiment of the present invention. Similar to the second embodiment, a status LED circuit 440 is in series with the capacitor C30 of the timing circuit 320. The status LED 445 is included inside a rectifier bridge BR40 to ensure that current flows through the LED in both half-cycles. A resistor R44 is provided in parallel with the switch S1 to allow the status LED 445 to illuminate to a dim level when the lighting load is off.

Figure 6:
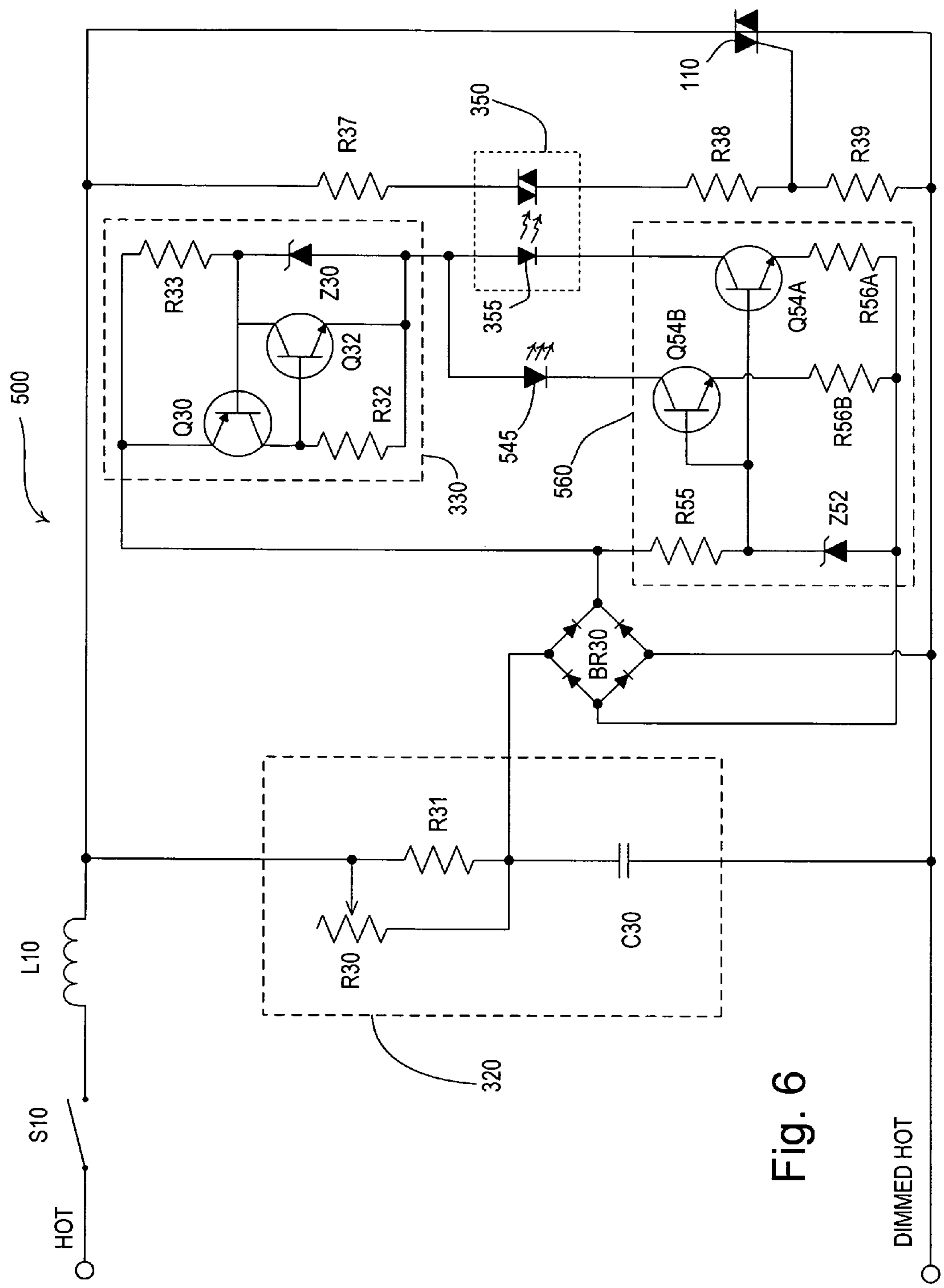
FIG. 6 shows a schematic diagram of a two-wire dimmer including a status LED according to a fifth embodiment of the present invention.

FIG. 6 shows a two-wire dimmer 500 including a status LED 545 according to a fifth embodiment of the present invention. The dimmer 500 incorporates a new current-limit circuit 560 that comprises two transistors Q54A, Q54B, three resistors R55, R56A, R56B, and a zener diode Z52. The photodiode 355 of the optocoupler 350 is in series with a first current limit portion that includes the first transistor Q54A and the resistor R56A. The first current limit portion operates to limit the current through the photodiode 355. The status LED 545 is in series with a second current limit portion, i.e., the second transistor Q54B and the resistor R56B, which operates to limit the current through the status LED. Accordingly, the current-limit circuit 560 includes the two current limit portions to allows for two separate current limits for the photodiode 355 and the status LED 545 as set by the resistances of resistors R56A and R56B, respectively. The break-over voltage of the zener diode Z52 is preferably 3.3V.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A load control device for controlling the amount of power delivered to an electrical load from an AC power source, the load control device comprising:

a controllably conductive device adapted to be coupled between the AC power source and the electrical load to control the amount of power delivered to the electrical load, the controllably conductive device having a control input;

a timing circuit adapted to be coupled between the AC power supply and the lighting load, the timing circuit having an output for providing a timing signal;

a triggering circuit operatively coupled between the output of the timing circuit and the control input of the controllably conductive device, the triggering circuit operable to conduct a control current in response to the timing signal, the controllably conductive device rendered conductive in response to the control current; and a status indicator circuit operable to conduct the control current and provide a status indication in response thereto.

2. The load control device of claim 1, wherein the status indicator circuit comprises an illuminable status indicator.

3. The load control device of claim 2, wherein the timing circuit comprises a timing resistor coupled in series electrical connection with a timing capacitor, the series combination of the timing resistor and the timing capacitor coupled in parallel electrical connection with the controllably conductive device, the output of the timing circuit provided at the junction of the timing resistor and the timing capacitor; and wherein the status indicator circuit is coupled in series electrical connection with the timing capacitor.

4. The load control device of claim 3, wherein the status indicator is illuminated when the load control device is providing power to the load and the status indicator is illuminated to a dim level when the load control device is not providing power to the load.

5. The load control device of claim 4, wherein the electrical load comprises a lighting load; and wherein the status indicator is illuminated when the lighting load is illuminated and the status indicator is illuminated to a dim level when the lighting load is not illuminated.

6. The load control device of claim 4, further comprising:

a mechanical switch coupled in series electrical connection with the controllably conductive device; and a resistor coupled in parallel electrical connection with the mechanical switch for allowing the status indicator to be illuminated to a dim level when the mechanical switch is open.

7. The load control device of claim 3, wherein the status indicator is illuminated when the load control device is providing power to the load, and the status indicator is not illuminated when the load control device is not providing power to the load.

8. The load control device of claim 7, wherein the electrical load comprises a lighting load; and wherein the status indicator is illuminated when the lighting load is illuminated, and the status indicator is not illuminated when the lighting load is not illuminated.

9. The load control device of claim 3, wherein the status indicator circuit further comprises a rectifier bridge having AC terminals coupled in series electrical connection with the timing capacitor, and DC terminals coupled in series electrical connection with the illuminable status indicator, such that the status indicator is operable to illuminate when the timing capacitor is charging and discharging.

10. The load control device of claim 9, wherein the status indicator is operable to conduct four pulses of current during each line cycle of the AC power source.

11. The load control device of claim 3, wherein the controllably conductive device comprises a bidirectional semiconductor switch.

12. The load control device of claim 11, wherein the bidirectional semiconductor switch comprises a triac.

13. The load control device of claim 12, further comprising:

a rectifier bridge having AC terminals coupled to the timing circuit for receipt of the timing signal and DC terminals coupled in series electrical connection with the triggering circuit; and an optocoupler having an input coupled in series electrical connection with the triggering circuit and an output coupled to the control input of the triac, such that when the triggering circuit and the input of the optocoupler conduct the control current, the output of the optocoupler is operable to conduct a gate current through the control input of the triac, thereby rendering the triac conductive.

14. The load control device of claim 13, wherein the timing circuit comprises a timing resistor coupled in series electrical connection with a timing capacitor, the series combination of the timing resistor and the timing capacitor coupled in parallel electrical connection with the controllably conductive device, the output of the timing circuit provided at the junction of the timing resistor and the timing capacitor; and wherein the status indicator circuit further comprises a second rectifier bridge having AC terminals coupled in series electrical connection with the timing capacitor, and DC terminals coupled in series electrical connection with the illuminable status indicator, such that the status indicator is operable to illuminate when the timing capacitor is charging and discharging.

15. The load control device of claim 14, further comprising:

a current limit circuit coupled in series electrical connection with the triggering circuit and the input of the optocoupler, the current limit circuit operable to limit the magnitude of the control current.

16. The load control device of claim 13, wherein the status indicator circuit is coupled in series electrical connection with the triggering circuit and the input of the optocoupler.

17. The load control device of claim 16, further comprising:

a current limit circuit coupled in series electrical connection with the triggering circuit and the input of the optocoupler, the current limit circuit operable to limit the magnitude of the control current.

18. The load control device of claim 2, wherein the status indicator circuit is coupled in series electrical connection with the control input of the controllably conductive device and the control current is operable to flow through the control input.

19. The load control device of claim 18, wherein the triggering circuit comprises a diac characterized by a break-over voltage, the diac operable to conduct the control current through the control input of the controllably conductive device when a voltage across the diac exceeds the break-over voltage of the diac.

20. The load control device of claim 18, further comprising:

a current limiting resistor coupled in series electrical connection with the triggering device and the control input of the controllably conductive device.

21. The load control device of claim 2, wherein the illuminable status indicator comprises a light-emitting diode.

22. A load control device for controlling the amount of power delivered to an electrical load from an AC power source, the load control device comprising:

a bidirectional semiconductor switch adapted to be coupled between the AC power source and the electrical load, the semiconductor switch having a control input;

a timing circuit adapted to be coupled between the AC power source and the electrical load, the timing circuit comprising a capacitor and an output for providing a timing signal;

a triggering circuit operatively coupled between the output of the timing circuit and the control input of the semiconductor switch, the triggering circuit operable to conduct a control current in response to the timing signal; and a status indicator circuit coupled in series electrical connection with the capacitor of the timing circuit, the status indicator circuit comprising an illuminable status indicator and a rectifier bridge, the illuminable status indicator coupled inside the rectifier bridge such that the status indicator is operable to illuminate when the capacitor is charging and discharging;

wherein the status indicator is illuminated to a substantially dim level when the electrical load is not powered and the status indicator is illuminated to a substantially bright level when the electrical load is powered.

23. A load control device for controlling the amount of power delivered to an electrical load from an AC power source, the load control device comprising:

a bidirectional semiconductor switch adapted to be coupled between the AC power source and the electrical load, the semiconductor switch having a control input;

a timing circuit adapted to be coupled between the AC power source and the electrical load, the timing circuit having an output for providing a timing signal;

a rectifier bridge having AC terminals coupled to the timing circuit for receipt of the timing signal and DC terminals;

a triggering circuit coupled in series electrical connection with the DC terminals of the rectifier bridge and characterized by a break-over voltage, the triggering circuit operable to conduct a control current when a voltage across the triggering circuit exceeds the break-over voltage of the triggering circuit;

an optocoupler having an input coupled in series electrical connection with the triggering circuit and an output coupled to the control input of the semiconductor switch, such that when the triggering circuit and the input of the optocoupler conduct the control current, the output of the optocoupler is operable to conduct a gate current through the control input of the semiconductor switch, thereby rendering the semiconductor switch conductive; and an illuminable status indicator coupled in series electrical connection with the triggering circuit and the input of the optocoupler; the status indicator illuminated when the electrical load is powered and not illuminated when the electrical load is not powered.

24. The load control device of claim 23, further comprising:

a current limit circuit coupled in series electrical connection with the triggering circuit and the input of the optocoupler, the current limit circuit operable to limit the magnitude of the control current.

25. A load control device for controlling the amount of power delivered to an electrical load from an AC power source, the load control device comprising:

a bidirectional semiconductor switch adapted to be coupled between the AC power source and the electrical load, the semiconductor switch having a control input;

a timing circuit adapted to be coupled between the AC power source and the electrical load, the timing circuit having an output for providing a timing signal;

a rectifier bridge having AC terminals coupled to the timing circuit for receipt of the timing signal and DC terminals;

a triggering circuit coupled in series electrical connection with the DC terminals of the rectifier bridge and characterized by a break-over voltage, the triggering circuit operable to conduct a control current when a voltage across the triggering circuit exceeds the break-over voltage of the triggering circuit;

an optocoupler having an input coupled in series electrical connection with the triggering circuit and an output coupled to the control input of the semiconductor switch, such that when the triggering circuit and the input of the optocoupler conduct the control current, the output of the optocoupler is operable to conduct a gate current through the control input of the semiconductor switch, thereby rendering the semiconductor switch conductive;

an illuminable status indicator coupled in series electrical connection with the triggering circuit and in parallel electrical connection with the input of the optocoupler, the status indicator illuminated when the electrical load is powered and not illuminated when the electrical load is not powered; and a current limit circuit coupled in series electrical connection with the triggering circuit, the current limit circuit having a first current limit portion coupled in series electrical connection with the input of the optocoupler for limiting the magnitude of the current through the input, and a second current limit portion coupled in series electrical connection with the illuminable status indicator for limiting the magnitude of the current through the status indicator.

26. A method of providing an illuminable status indicator on a load control device for controlling the amount of power delivered to an electrical load from an AC power source, the method comprising the steps of:

coupling a controllably conductive device in series electrical connection between the AC power source and the electrical load for controlling the power delivered to the electrical load;

conducting a charging current through a timing capacitor;

conducting a control current through a triggering device in response to the step of conducting a charging current; and conducting a gate current through a control input of the controllably conductive device in response to the step of conducting a control current;

wherein the illuminable status indicator is operable to illuminate in response to the step of conducting the control current.

27. The method of claim 26, wherein the step of conducting a control current comprises conducting the control current through the timing capacitor, the triggering device, and the illuminable status indicator.

28. The method of claim 27, wherein the step of conducting a charging current comprises conducting the charging current through the timing capacitor and the illuminable status indicator;

wherein the illuminable status indicator is operable to illuminate in response to the step of conducting a charging current.

29. The method of claim 28, wherein the charging current has a first magnitude when the electrical load is powered and a second magnitude when the electrical load is not powered.

30. The method of claim 29, wherein the first magnitude is substantially greater than the second magnitude, such that the illuminable status indicator is operable to illuminate to a greater level when the electrical load is powered than when the electrical load is not powered.

31. The method of claim 30, wherein the second magnitude is greater than zero amps.

32. The method of claim 30, wherein the second magnitude is substantially zero amps.

33. The method of claim 26, wherein the step of conducting a gate current comprises conducting the control current through the control input of the controllably conductive device.

* * * * *